Dec. 6, 1955   B. A. BENSON   2,725,777
LIVE CENTERS
Filed June 11, 1952
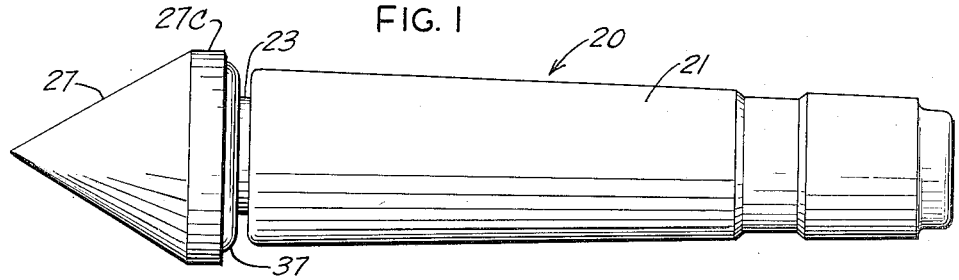
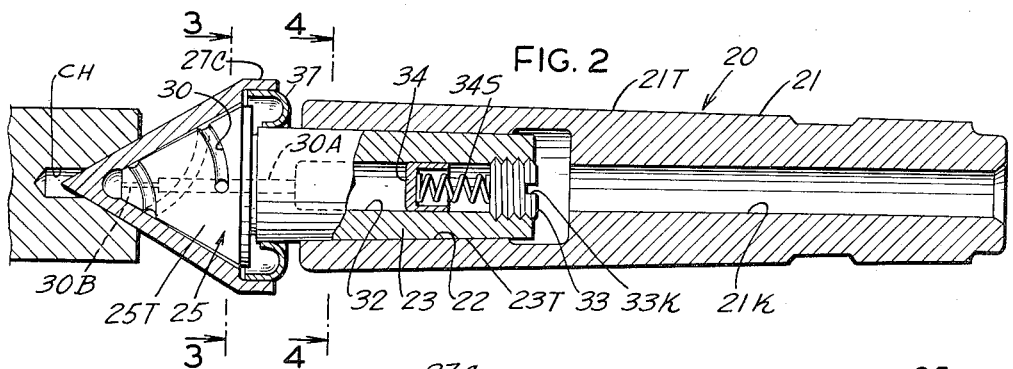
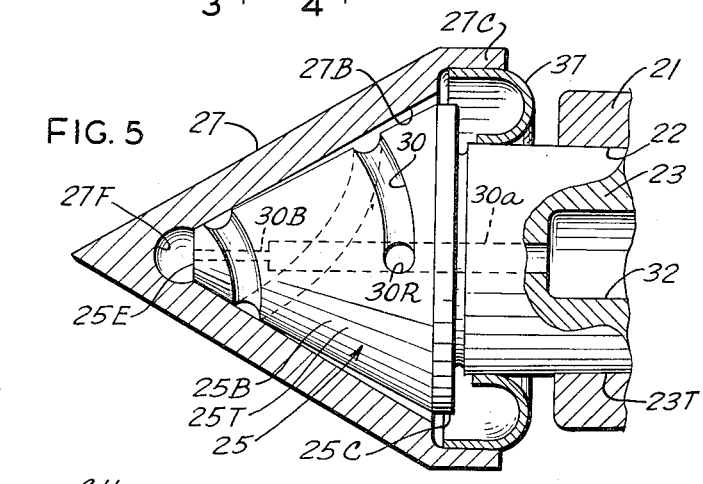
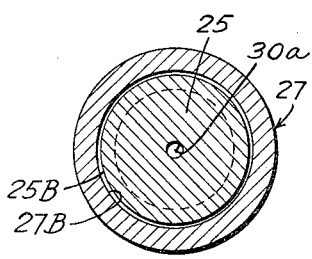
FIG. 3
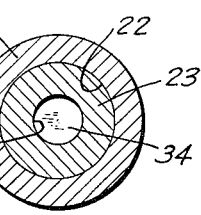
FIG. 4
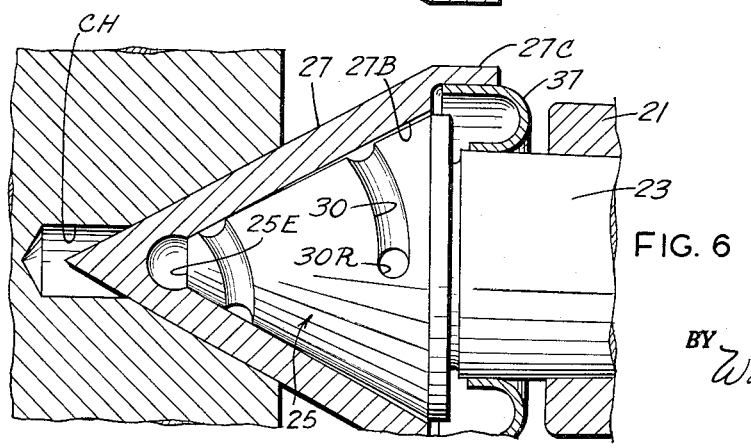
*INVENTOR.*
BERT A. BENSON
BY *Wallace and Cannon*
ATTORNEYS

United States Patent Office 2,725,777
Patented Dec. 6, 1955

2,725,777
LIVE CENTERS
Bert A. Benson, Evergreen Park, Ill.
Application June 11, 1952, Serial No. 292,885
3 Claims. (Cl. 82—33)

This invention relates to work supports for lathes and, more specifically, to live centers adapted to be utilized as the work support at the tailstock end of a lathe.

In modern lathe practice it has become quite common to utilize a live center as the tailstock support for work, as contrasted with the more common dead tailstock center, but such live tailstock centers have, in many instances, been considered to be objectionable because heretofore it has been necessary to embody antifriction bearings in such live centers. These antifriction bearings have invariably been of such character as to limit the positions in which the operating tools may be located in relation to the work, this limitation arising primarily because of the large diameter of such antifriction bearings and the location thereof relatively close to the work-engaging tip of the live center. Moreover, it is found in practice that live centers as heretofore constructed are inherently inaccurate as a work-centering means, so that where extreme accuracy of centering has been important, such prior live centers could not be used as a practical matter.

In view of the foregoing, it is an important object of the present invention to enable a live tailstock center to be afforded that is compact in character and simple in structure, and which in the matter of centering accuracy approaches quite closely the accuracy of a dead center, and an object related to the foregoing is to provide such a live tailstock center in which the center is of relatively small diameter adjacent to the work engaging point thereof, thereby to enable the cutting tools to be freely positioned and manipulated in relation to the tailstock end of the work.

Another and important object of the present invention is to provide a live tailstock center in which the use of ball bearings or the like is avoided, and in which the relatively moving bearing surfaces are arranged to bear directly one against the other. More particularly, it is an object of the present invention to afford such a live tailstock center that is free running under light loads as, for example, when a small or light workpiece is being supported, and which will nevertheless afford adequate bearing surfaces which are effective when heavy, endwise and lateral loads are imposed thereon. More specifically, it is an object of the present invention to afford such a live tailstock center in which the effective bearing area is varied in proportion to the load that is impressed thereon, and a related object is to accomplish this in a simple and economical manner.

A further and important object of the present invention is to afford such a live tailstock center in which the relatively rotating parts are in metal to metal contact, and in which adequate and continuous lubrication is provided for such bearing surfaces. A related object is to afford such a live tailstock center in which the lubricating action is attained by means which are simple and economical in character.

Other and further objects of the present invention will be apparent from the following description and claims and are illustrated in the accompanying drawing which, by way of illustration, shows a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

Fig. 1 is a side elevational view of a live center embodying the features of the invention;
Fig. 2 is a longitudinal sectional view of the live center;
Figs. 3 and 4 are transverse cross sectional views taken substantially along 3—3 and 4—4;
Fig. 5 is an enlarged portion of Fig. 2; and
Fig. 6 is a view similar to Fig. 5, and showing the live center under heavy load.

For purposes of disclosure, the invention is herein illustrated as embodied in a live tailstock centr 20, having a main shank 21 tapered on its outer surface as at 21T so that the shank 21 may be mounted in the usual manner in the tailstock of a lathe. The shank 21, at its forward or larger end, has a relatively large tapered socket 22 formed axially therein to receive a secondary shank 23 that has a tapered surface 23T that is complemental to the tapered socket 22, and it might be observed in this regard that the shank 21 has an axial knockout passage 21K extended from the smaller end thereof into the smaller end of the socket 22 whereby the secondary shank 23 may be readily and easily driven out of its mounted relationship in respect to the socket 22.

At its forward or larger end, the secondary shank 23 has an enlarged head 25 formed thereon, this head having a cylindrical portion 25C and truncated conical bearing surface 25B formed thereon. The bearing surface 25B serves as the stationary bearing surface for a work engaging cap 27 that is generally conical in form, and which has a cylindrical skirt 27C at its larger or rear end. The outer surface of the conical cap 27 is indicated at 27W, and it is this surface that engages with the conical centerhole that is afforded in the workpiece. Thus, when the centerhole CH of a workpiece is engaged with the surface 27W, the endwise forces that are applied between these parts cause the inner bearing surface 27B of the cap 27 to bear against the bearing surface 25B of the head 25.

The particular way in which the bearing surfaces 25B and 27B are related under the present invention will be described in detail hereinafter, but it must be pointed out that since these bearing surfaces are under relatively heavy load, lubrication thereof is essential. Thus, it will be observed that the bearing surface 25B has a spiral lubricant distributing groove 30 formed therein which extends throughout substantially the entire length of the bearing surface 25B, that is from the smaller or truncated end 25E thereof to its point of juncture with the cylindrical portion 25C, and at a point adjacent to the surface 25C, a radial hole 30R is formed so as to extend inwardly to meet an axial lubricant passage 30A formed in the head 25 and extending rearwardly or to the right into a lubricant supply chamber 32 formed in the secondary shank 23. The passage 30A has a reduced forward extension 30B which opens through the truncated end 25E of the head 25, thus to enable grease to be fed into a chamber 27F formed forwardly of the surface 25B by a semi-spherical enlargement formed in the cap 27 at the small end of the conical bearing surface 27B. The lubricant supply chamber 32 is in the form of a bore which extends axially and through the rear or smaller end of the secondary shank 23, and near this rear end the chamber 32 is threaded to receive a closure plug 33. Within the supply chamber 32 a feeding piston 34 is provided which is urged in a forward or feeding direction by an expansive coil spring 34S that is disposed between the piston 34 and the plug 33. The plug 33 has a kerf 33K formed therein so that the lubricant may be placed under an initial pressure and may be fed by expansion of the spring 25.

The lubricant that is thus fed into the space between the bearing surfaces 25B and 27B is confined by means of an annular lubricant retainer 37 that is herein shown as being of U-shaped cross section which is arranged with a close fit within skirt or flange 27C, and which has one side thereof engaged with the shank 23, and the retainer 37, having its inner flange disposed rearwardly of the head 25, serves also as a retainer to hold the cap 27 in position on the head 25.

The surfaces 25B and 27C, under the present invention, are so related that the area of bearing contact between the cap 27 and the head 25 is minimized under normal conditions, and is maintained at a minimum so long as the load impressed on the live center is relatively small. This causes the live center to have a free running action under light loads, and yet under the present invention adequate bearing surfaces are rendered effective as an incident to the impression of larger or heavier loads on the live center. Thus, as will be evident in Fig. 5 of the drawings, where the spacing of the bearing surfaces is illustrated in an exaggerated manner, the central angle of the bearing surface 27B of the tip 27 is somewhat larger than the central angle of the bearing 25B, and with this relationship, the conical bearing surfaces 27B and 25B gradually diverge toward the rear or larger diameter ends thereof. This relationship is such that in the absence of load, the larger ends of the bearing surfaces will be spaced approximately one one-thousandth of an inch (.001 inch) from each other. Hence, under a light load, only small annular portions of these opposed bearing surfaces are in actual bearing contact, and such bearing contact is located at or relatively close to the forward or small ends of these bearing surfaces. When a larger workpiece is to be supported, it is, of course, necessary that a larger center hole CH be provided in the work, as diagrammatically indicated in Fig. 6 of the drawings, and the tapered surface of such centerhole engages the outer conical face of the cap 27 for a greater distance from the point or end of the cap. Thus when the larger endwise force is applied between the work and the cap 27, the larger end of the cap 27 is, in effect, compressed toward a smaller diameter which progressively tends to bring the bearing surface 27B into greater contact with the surface 25B, and as great lateral forces are applied to the work by the cutting tool, the cap 27, by reason of the divergent relation of the bearing surfaces, may shift slightly under such lateral forces to render greater bearing surface effective to resist such lateral load. Hence, this greater bearing surface becomes effective in those instances where the load is relatively great, and the wearing characteristics of the live center of the present invention are rendered extremely favorable so as to produce a live center having an exceptionally long useful life.

It should be noted in connection with the present invention that the head 25 and the large cylindrical portion 27C of the cap are but slightly greater in diameter than the diameter of the center hole that is to be engaged by the cap 27, and in particular it is important to observe that this diameter is much smaller than the diameter that would be required if antifriction bearings were to be employed. By reason of this small overall diameter of the live center of the present invention, the user is enabled to position the working tool relatively close and at almost any desired angle with respect to the tailstock end of the workpiece.

From the foregoing description, it will be evident that the present invention affords a novel and advantageous live tailstock center which is simple in character, and which has a long useful life. Moreover, it will be apparent that the live tailstock center of the present invention has but a small diameter at the work engaging end thereof, thus to enable freedom of tool position to be achieved. The live tailstock center of the present invention also affords a novel and advantageous lubricating arrangement that is simple and economical in character.

Thus while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. In a live center for lathes, a shank having an enlarged head on its forward end, said head having a conical external bearing surface formed thereon and tapering forwardly and centered on an axis concentric with said shank, a cap of conical form and having a relatively thin side wall section affording an outer conical surface for engagement with the center hole of a workpiece, said cap having an inner bearing surface of a conical form having its apex angle slightly greater than the apex angle of said bearing surface of said head, said cap being disposed about and in bearing relationship with respect to said bearing surface of said head, with an internal bearing surface of said cap diverging slightly from the bearing surface of said head, and being compressible into progressively increasing bearing contact by the application of large endwise loads to said cap.

2. In a live center for lathes, a longitudinally tapered mounting shank having an enlarged head on its forward end, said head having a conical external bearing surface formed thereon and tapering forwardly and centered on the axis of said shank, said conical portion of said head being truncated, a cap of conical form and having a relatively thin side wall section affording an outer conical surface for engagement with the center hole of a workpiece, said cap having an inner bearing surface of a conical form having its apex angle slightly greater than the apex angle of said bearing surface of said head, said cap being disposed above and in bearing relationship with respect to said bearing surface of said head, with an internal bearing surface of said cap diverging slightly from the bearing surface of said head and being compressible into progressively increasing bearing contact by the application of large endwise loads to said cap, lubricant retaining means acting between said cap and said shank rearwardly of said head, a lubricant reservoir formed within said shank, lubricant feeding means disposed within said reservoir, and lubricating passageways extending from said reservoir through said head and to the bearing surfaces of said head and through said truncated end of said head.

3. In a live center for lathes, a shank having an enlarged head at the forward end thereof, said head having a conical forwardly facing bearing surface formed thereon and centered upon the axis of said shank, a cap having an outer conical work engaging surface and an inner conical bearing surface, said bearing surfaces of said cap and said head being formed with different apex angles whereby said bearing surfaces gradually diverge one from the other toward the large end of said cap, a cylindrical skirt formed to project rearwardly from the rear end of said conical cap, an annular lubricant sealing means disposed between said skirt and said shank and effective to hold said tip in position on said head and to also serve as a grease or lubricant retainer, said shank having an axial lubricant chamber formed therein and opening through the other end of said shank, a feed piston slidable in said chamber, a spring acting on said piston to urge said piston away from said other end of said shank, a plug in said end of said chamber against which said spring reacts, and passages in said shank from said chamber through which lubricant may feed through said head and into the space between said bearing surfaces.

References Cited in the file of this patent

UNITED STATES PATENTS

| 493,119 | Roe | Mar. 7, 1893 |
| 868,448 | Keil | Oct. 15, 1907 |
| 1,403,694 | Kingsbury | Jan. 17, 1922 |
| 1,491,332 | Brown | Apr. 22, 1924 |
| 2,343,626 | Adas | Mar. 7, 1944 |

FOREIGN PATENTS

| 889,174 | France | Jan. 3, 1944 |